April 7, 1936.   O. WITTEL   2,036,378

FILM MAGAZINE CONSTRUCTION

Filed Dec. 20, 1933    2 Sheets—Sheet 1

Inventor:
Otto Wittel,
By Newton M. Perrin
George A. Gillette, Jr.
Attorneys

April 7, 1936.   O. WITTEL   2,036,378
FILM MAGAZINE CONSTRUCTION
Filed Dec. 20, 1933   2 Sheets-Sheet 2
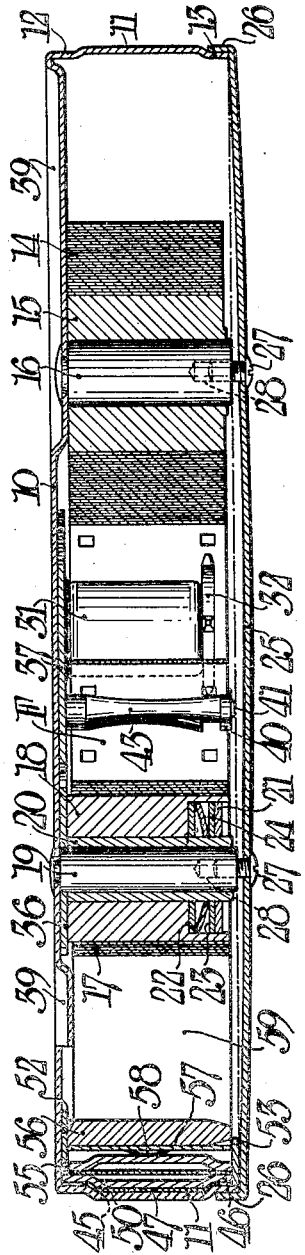
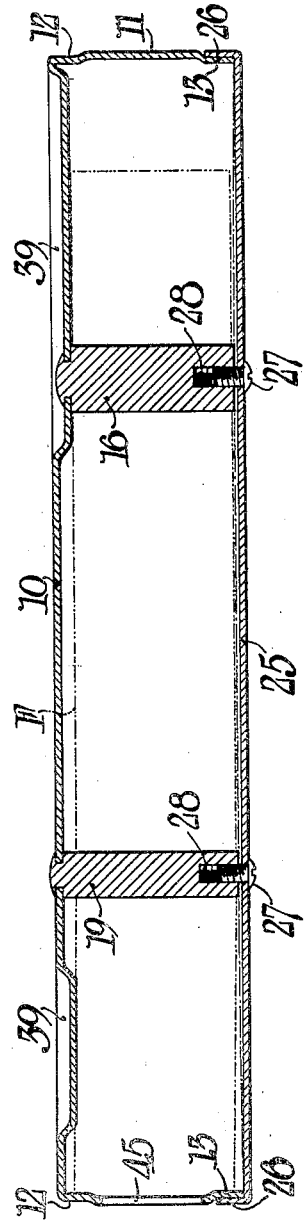
Inventor:
Otto Wittel,
By
Newton N. Perrins
George A. Gillette, Jr.
Attorneys Patented Apr. 7, 1936

2,036,378

UNITED STATES PATENT OFFICE 2,036,378

FILM MAGAZINE CONSTRUCTION

Otto Wittel, Rochester, N. Y., assignor to Eastman Kodak Company, Rochester, N. Y., a corporation of New York Application December 20, 1933, Serial No. 703,256

20 Claims. (Cl. 88—17)

The present invention relates to the construction of a film magazine and more particularly to details of magazine construction which render the magazine compact and reliable in operation.

The primary object of the invention is the provision of a film magazine containing spindles for respective film rolls and having a cover which is normally spaced from the ends of said spindles, but which is drawn against the spindles by a fastening means, said spindles functioning as supports for the film rolls, spacers for the cover of the magazine, and one member of the fastening means.

Another object of the invention is the provision of a film gate within the magazine and of edge guiding means for centering the film with respect to an exposure aperture in the lateral wall of the magazine casing and including a guide member on the cover for the casing.

A further object of the invention is the provision of film edge guiding means on the cover of the magazine casing for centering the film at the exposure aperture, the major portion of the film path within the magazine being off-center with respect to said exposure aperture.

Still another object of the invention is the provision of guide means for maintaining the perforated film in engagement with a film sprocket, said guide means including a roller and a shaft for supporting the roller and which extends beyond the roller to prevent contact of the cover with the roller.

Other and further objects of the invention will be suggested to those skilled in the art by the following description.

The foregoing objects of the invention are embodied in a magazine construction comprising a casing, spindles within the casing for supporting the film rolls and extending beyond the outer edge of the film, a cover for the casing having a central portion which is normally spaced from the end of the spindles, and fastening means between the cover and the spindles for moving the central portion of the cover into engagement with the ends of the spindles. The side wall of the magazine casing is provided with a plurality of embossings and a portion of the film path is off-center with respect to an exposure aperture in the front wall of the magazine. Consequently, guide members are located on the cover of the magazine for engaging the edge of the film at the gate and for centering the film with respect to the exposure aperture.

Reference is hereby made to the accompanying drawings wherein like reference characters designate similar elements and wherein:

Fig. 3 is a longitudinal cross-section of the magazine taken on the line 3—3 of Fig. 1.

Fig. 5 is another transverse cross-section of the magazine showing the preferred form of the cover for the casing.

Figure 1:
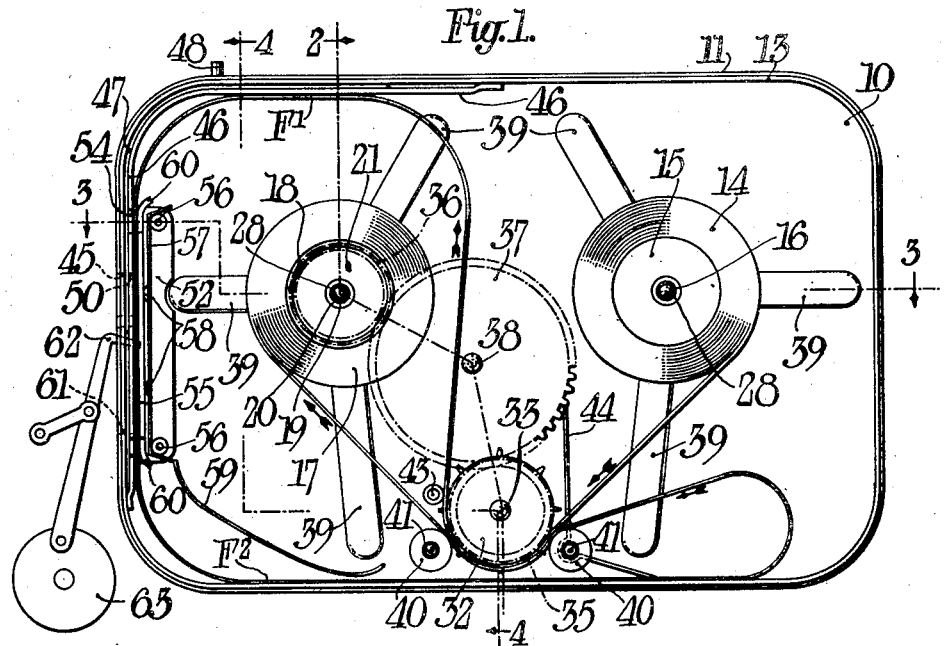
Fig. 1 is a side elevation of the film magazine according to the invention and with the cover for the casing removed.

In the illustrated embodiment of the invention the film magazine comprises a casing which has a side wall 10 and a lateral wall 11. The lateral wall 11 has an off-set portion 12 adjacent the side wall 10 and has an off-set rim 13 around the outer edge thereof. The outer edges of the off set rim 13 lie in a plane which may be designated as the plane of the off-set rim.

The supply film roll 14 is wound upon a core 15 and is rotatably supported by a spindle 16 which is fastened to the side wall 10 and which extends through the center of core 15. The takeup film roll 17 is wound upon a core 18 and is rotatably supported by a spindle 19 which extends through the center of a sleeve 20 upon which the core 18 may turn. A frictional connection is provided between core 18 and sleeve 20 and may be provided within a recess in one end of core 18. Such a frictional connection may include a disk 21 attached to sleeve 20, a friction washer 22 on disk 21, a friction washer 23 on core 18, and a dished spring 24 between said friction washers 22 and 23.

Figure 2:
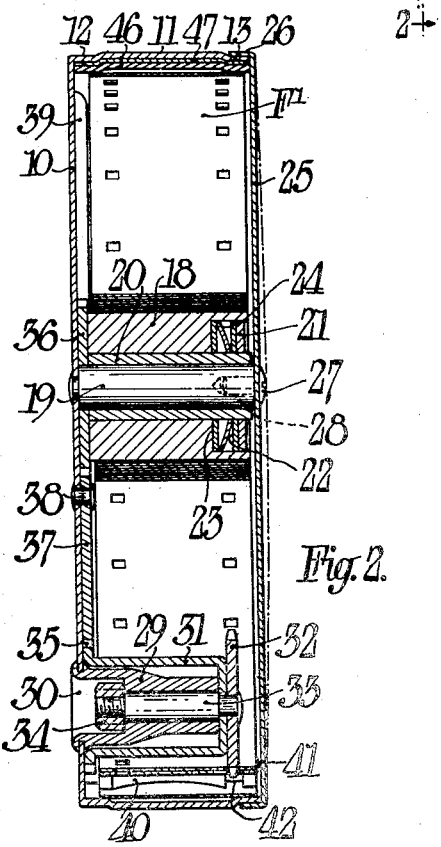
Fig. 2 is a transverse cross-section of the magazine taken on the line 2—2 of Fig. 1.

The spindles 16 and 19 extend transversely of the magazine casing and extend beyond the edges of the film F. The distances that said spindles 16 and 19 extend beyond the film edges are very small, in the order of a few thousandths, and are merely sufficient to provide proper clearances between the edges of the film and the sides of the magazine. The magazine casing is enclosed by a cover 25 which has a flange 26 around the edge thereof for engagement with the off-set rim 13 of lateral wall 11. The cover 25, as seen in Fig. 3, is provided with a bulge so that the central portion of cover 25 is normally spaced from the ends of spindles 16 and 19. This bulge in cover 25 may be overcome by a fastening means for moving the central portion of cover 25 into abutment with the ends of spindles 16 and 19. Such a fastening means may comprise a pair of bolts 27 which pass through the cover 25 and which may be threaded into threaded holes 28 provided in the ends of spindles 16 and 19. Referring to Fig. 3, the cover 25 is in place, but the bolts 27 have not yet been tightened. Fig. 2 illustrates the formation of cover 25 after the bolts 27 have been tightened, while the dot-dash line of that figure indicates the original formation of cover 25. The purpose of extending spindles 16 and 19 beyond the edges of the film F is now apparent because the bolts 27 cannot be tightened so much as to clamp the film between the sides of the magazine.

Since the provision of a bulge in the cover 25 greatly increases the cost of tools for manufacturing that part, the construction shown in Fig. 5 is preferred. The cover 25 is flat throughout its central portion according to this modification so that the tools for forming this member are less expensive than the tools for forming the cover with a bulge. The spindles 16 and 19, as before, extend beyond the edges of the film F, but do not extend to the plane of the off-set rim. Again the central portion of cover 25 is normally spaced from the ends of spindles 16 and 19 and may be drawn by fastening means into abutment with the ends of spindles 16 and 19.

The advantages of the disclosed construction and fastening means for the cover are that the light-tight joint between the cover and casing is more effective and the loading or assembly of the magazine is simplified.

Although the invention may be applied with equal success to any form of film magazine, it is here disclosed as embodied in a film magazine which contains preformed film loops. A film sprocket for maintaining the preformed loops may include a bushing 29 which is fastened to side wall 10 and which has a recess 30, includes a cap 31 and a toothed disk 32 both on a shaft 33 which extends through bushing 29, and includes a nut 34 which is threaded to shaft 33 and which has a toothed periphery for engagement with an appropriate camera part, not shown.

A driving means is arranged between the film sprocket and the take-up. Such a driving means includes a plurality of gears, one such gear 35 is formed by providing teeth on the rear of cap 31, a pinion gear 36 is fastened to the sleeve 20 of the take-up and a pinion gear 37 is rotatably mounted on side wall 10 by a stud 38 and meshes with gears 35 and 36. Thus upon rotation of the film sprocket in a clockwise direction, as viewed from Fig. 1, the take-up core 18 will also be rotated in a clockwise direction through the gear train including gears 35, 36, and 37.

The path of the film through the magazine is optional, but is disclosed herein as extending from the supply film roll 14, around the toothed disk 32 of the film sprocket, in a film loop extending along the front and bottom of the magazine, in a superposed layer again around the toothed disk 32 and thence to the take-up film roll 17.

In order to provide clearance between the driving gears and the inner edges of the film F, and in order to minimize the friction between said film edges and the side wall 10 a plurality of embossings 39 are formed in side wall 10. These embossings 39 extend transversely of the driving gears and extend into the interior of the magazine a distance greater than the thickness of said gears so that, as before indicated, the edges of the film F cannot come in contact with any of the gears 35, 36, or 37.

The layers of film are maintained in engagement with the film sprocket by a guide means which may include a pair of rollers 40 mounted on a pair of spindles 41 which are fastened to the side wall 10. Said spindles 41 extend a slight distance beyond the outer ends of rollers 40, as seen in Figs. 2 and 3, for the purpose of preventing the cover 25 from engaging the ends of rollers 40 and preventing their rotation. The rollers 40 are each provided with a groove 42 which receives the ends of the teeth on toothed disk 32 of the film sprocket. A stem 43 is also fastened to side wall 10 and located adjacent the film sprocket to assist in maintaining engagement between the film and the sprocket.

A unidirectional clutch means is provided within the film magazine and is associated with the film sprocket in order to prevent reverse rotation of said film sprocket under the action of the inherent resiliency of the supply film roll 14 or jars imparted to the magazine during shipment or interchange. Such a unidirectional clutch means in its preferred form comprises a wire spring 44 which is snapped onto one of the spindles 41, has one end against the off-set portion 12 of the lateral wall 11, and has the other end riding with slight friction over the teeth of pinion gear 37. The embossings 39, of course, also serve to prevent the film edges from touching the unidirectional clutch means.

An exposure aperture 45 is provided in the front lateral wall 11 of the magazine casing. An auxiliary lateral wall 46 extends along the front and upper portions of the lateral wall 11 and is spaced therefrom. A flexible slide 47 is located between lateral wall 11 and auxiliary lateral wall 46 and may be moved by a pin 48 which extends through a slot 49 in the lateral wall 11. The auxiliary lateral wall 46 is also provided with an exposure aperture 50. The exposure apertures 45 and 50 are in alinement with each other and are laterally centered within the respective lateral walls 11 and 46. An upper film loop F₁ extends from the film sprocket to the exposure aperture, while a lower film loop F₂ extends from the exposure aperture to the film sprocket. Since the film at the sprocket is laterally off-center with respect to the side wall 10 and cover 25 of the magazine casing, the film at the exposure apertures will also tend to assume an off-center position, but since the exposure apertures 45 and 50 are laterally centered in the lateral walls 11 and 46, a film edge guiding means must be provided for overcoming this slight lateral displacement which is best indicated at 51 in Fig. 4. Such an edge guiding means includes a plate 52 which is fastened to side wall 10 and includes a guide member which is fastened to the cover 25. Such a guide member may be composed of a pair of bosses 53 riveted to cover 25. Such bosses 53 are located to engage the outer edge of the film adjacent the exposure apertures 45 and 50 and are of predetermined thicknesses so that the film is laterally centered with respect to said exposure apertures. The bosses 53 are also dimensioned so that there is proper clearance between their inner surfaces and the surface of plate 52 for easy passage of the film, even when the cover 25 has been brought into abutment with the ends of spindles 16 and 19. The auxiliary lateral wall 46 must be provided with notches 54 to receive the bosses 53 on the cover 25.

The film at the gate is held flat by a pressure member 55 which is held in place by any convenient means. According to the invention the pressure member 55 is resiliently held against the film by a support means which may comprise a pair of pins 56 which are fastened to side wall 10 and may comprise a resilient member 57 between the pressure member 55 and the pins 56. A pair of projections 58 are formed out of resilient member 57 and make substantially point contact with the rear surface of pressure member 55. The resilient member 57 has an extension 59 which is adjacent the lower film loop F₂. This extension or tail 59 prevents buckling of the film in the lower loop which may occur upon operation of the magazine after the film has been stored under unfavorable atmospheric conditions and has taken a set. The pressure member 55 is provided with recesses 60 for the purpose of furnishing clearances with respect to the bosses 53.

The lateral wall 11 and the auxiliary lateral wall 46 are each provided with an elongated slot 61 so as to provide access for a claw 62 to the film in the gate. The claw 62 may be actuated in any well-known manner, such as by an eccentric 63. The flexible slide 47 is adapted not only to cover in closed position the exposure apertures 45 and 50, but also to cover the elongated slot 61 for the film engaging claw 62.

Figure 4:
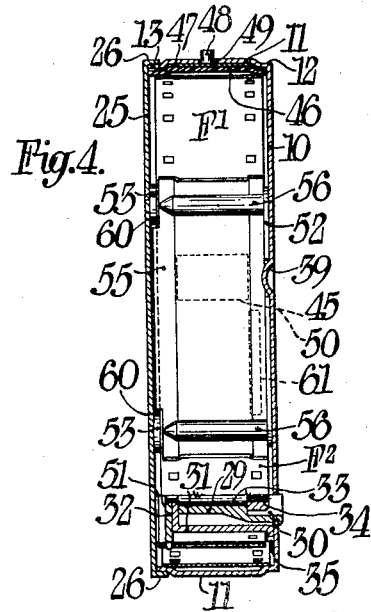
Fig. 4 is another transverse cross-section of the magazine taken on the line 4—4 of Fig. 1.

In the event that only a single claw is used for advancement of the film and such practice is now quite standard, the claw will have a tendency to swing as well as to advance the film within the gate. Referring to Fig. 4, it is evident that a film advancing stroke on the part of the claw will tend to swing the film in a clockwise direction as viewed from that figure. Thus another necessity for the provision of edge guiding means, such as the bosses 53, is recognized.

Since many modifications of this magazine construction are possible without departing from the spirit of the invention, the present disclosure is to be construed as illustrative, the scope of the invention being defined by the appended claims.

Having now particularly described my invention what I desire to secure by Letters Patent of the United States and what I claim is:

1. In a film magazine, the combination with a casing having a side wall, a lateral wall extending around the edge of said side wall, and a cover for enclosing said casing, said lateral wall being provided with an exposure aperture which is laterally centered, a plurality of embossings in said side wall for locating some of the film in a laterally off-center position with one edge farther from said side wall than the other edge of the film is spaced from said cover, a film sprocket for maintaining pre-formed film loops on each side of said exposure aperture and positioned to engage the film in said laterally off-center position, and a pair of spindles for supporting respective film rolls within said casing and extending transversely and beyond the edge of the film in said off-center position, said cover having a central portion which is normally spaced from the ends of said spindles, of edge guiding means for centering the film with respect to said exposure aperture and including, on said cover, guide members for engaging one edge of the film which is adjacent the exposure aperture, and fastening means between said spindles and said cover and for moving the central portion of said cover into abutment with the ends of said spindles.

2. In a film magazine, the combination with a casing having a lateral wall, and a spindle for supporting a film roll within said casing, mounted on said casing and extending transversely beyond the edge of said film, of a cover having marginal portions for abutting the edges of said lateral wall and having a central portion normally spaced from the end of said spindle, and a fastening means between said spindle and said cover and for moving the central portion of said cover into abutment with the end of said spindle.

3. In a film magazine, the combination with a casing having a lateral wall with an off-set rim, and a spindle for supporting a film roll within said casing and mounted on said casing to extend transversely of the film and beyond the edge of said film, of a cover for said casing and having a flange for engaging said off-set rim and having a central portion which is normally spaced from the end of said spindle when the cover is on said casing, and a fastening means between said spindle and said cover and for moving the central portion of said cover into abutment with the end of said spindle.

4. In a film magazine, the combination with a casing having a lateral wall with an off-set rim, and a spindle for supporting a film roll within said casing and mounted on said casing to extend transversely of the film and beyond the edge of said film, of a cover for said casing and having a flange for engaging said off-set rim and having a central portion which is normally spaced from the end of said spindle when the cover is on said casing, and a threaded means between said spindle and said cover and for moving the central portion of said cover into abutment with the end of said spindle.

5. In a film magazine, the combination with a casing having a lateral wall with an off-set rim, and a spindle for supporting a film roll within said casing, having one end fastened to said casing, extending transversely beyond the edge of the film, and having the other end provided with a threaded hole, of a cover for said casing having a flange for engaging said off-set rim and having a central portion which is normally spaced from the end of said spindle and which is provided with a hole opposite the threaded hole in said spindle, and a bolt extending through the hole in said cover and into engagement with the threaded hole in said spindle and having a head for moving the central portion of said cover into abutment with the end of said spindle upon threading of said bolt into said threaded hole.

6. In a film magazine, the combination with a casing including a lateral wall and an off-set rim on said lateral wall, the outer edges of said off-set rim being in a plane, and a spindle for supporting a film roll within said casing, mounted on said casing and extending transversely beyond the edge of said film but short of the plane of the off-set rim, of a flat cover having a flange for engaging said off-set rim and having a central portion which is normally spaced from the end of said spindle, and a fastening means between said spindle and said cover and for moving the central portion of said cover through the plane of the off-set rim and into abutment with the end of said spindle.

7. In a film magazine, the combination with a casing including a lateral wall and an off-set rim on said lateral wall, the outer edges of said off-set rim being in a plane, and a pair of spindles for supporting respective film rolls within said casing, mounted on said casing and extending transversely beyond the edge of said film but short of the plane of the off-set rim, of a flat cover having a flange for engaging said off-set rim and having a central portion which is normally spaced from the ends of said spindles, and a fastening means including a pair of screws which pass through said cover to engage threaded holes in the ends of respective spindles and for pressing the central portion of said cover against the ends of said spindles and concavely to deform said cover.

8. In a film magazine, the combination with a casing including a lateral wall and an off-set rim on said lateral wall, the outer edges of said off-set rim being in a plane, and a spindle for supporting a film roll within said casing, mounted on said casing and extending transversely beyond the edge of said film and to the plane of the off-set rim, of a cover having a flange for engaging said off-set rim and having an exteriorally convex central portion which is normally spaced from the end of said spindle, and a fastening means between said spindle and said cover and for moving the convex central portion of said cover toward the plane of the off-set rim and into abutment with the end of said spindle.

9. In a film magazine, the combination with a casing having a lateral wall, the outer edges of which lie in a plane, and a film sprocket rotatably mounted for moving perforated film within said magazine, of a guide means for maintaining the perforated film in engagement with said sprocket and including a roller for engaging said film and including a stationary shaft on said casing rotatably to support said roller, upon which stationary shaft said roller is axially movable, and which shaft extends transversely of the casing, beyond the roller and to the plane of the outer edges of said lateral wall.

10. In a film magazine, the combination with a casing having a side wall, a pair of cores within said casing and for supporting respective film rolls, a film sprocket rotatably mounted with respect to said side wall and for maintaining preformed film loops within said casing, and a driving means connected between said film sprocket and one of said cores and including members which are rotatably mounted on said side wall, of a plurality of formations on the interior of said side wall, extending transversely beyond the members of said driving means and for spacing the edges of the film loops and the film rolls from said driving means and said side wall.

11. In a film magazine, the combination with a casing having a side wall, a pair of cores within said casing and for supporting respective film rolls, a film sprocket rotatably mounted with respect to said side wall and for maintaining preformed film loops within said casing, and a gear train between said film sprocket and one of said cores and including pinion gears which are rotatably mounted to said side wall, of a plurality of embossings in said side wall, extending inwardly a distance greater than the thicknesses of said pinion gears, and for spacing the edges of the film loops and the film rolls from said gears and said side wall.

12. In a film magazine, the combination with a casing having a side wall, a pair of supports within said casing for rotatably supporting respective film rolls, a film sprocket rotatably mounted with respect to said side wall and for maintaining preformed film loops within said casing, and a uni-directional clutch means connected to said film sprocket and including members mounted adjacent said side wall, of a plurality of embossings in said side wall, extending inwardly beyond the members of said uni-directional clutch means, and for spacing the edges of the film loops and the film rolls from said clutch means and said side wall.

13. In a film magazine, the combination with a casing having a lateral wall which is provided with an exposure aperture to form a gate member, a pressure member for holding a film against said lateral wall and across said aperture, and a film sprocket for maintaining preformed film loops within said magazine between the gate member and the film sprocket, of a support means within said casing and adjacent said pressure member, and a resilient member between said support means and said pressure member and including an extension which is adjacent one of the film loops to prevent buckling of the film in said loop.

14. In a film magazine, the combination with a casing having a lateral wall which is provided with an exposure aperture to form a gate member, a pressure member for holding a film against said lateral wall and across said aperture, and a film sprocket for maintaining preformed film loops within said magazine between the gate member and the film sprocket, of a pair of pins within said casing and behind said pressure member, and a leaf spring between said pins and said pressure member and having a pair of projections formed out of said leaf spring and for engaging the rear of said pressure member.

15. In a film magazine, the combination with a casing having a lateral wall which is provided with an exposure aperture to form a gate member, and a pressure member for holding a film against said lateral wall and across said aperture, of a cover engaging said lateral wall and enclosing said casing, and edge guiding means for centering the film with respect to said exposure aperture and including on said cover a guide member for engaging one edge of the film between the gate and pressure members.

16. In a film magazine, the combination with a casing having a lateral wall which is provided with an exposure aperture to form a gate member, and a pressure member for holding a film against said lateral wall and across said aperture, of a cover engaging said lateral wall and enclosing said casing, and edge guiding means including on said cover a guide member for engaging one edge of the film between the gate and pressure members and of predetermined thickness to center said film with respect to said exposure aperture.

17. In a film magazine, the combination with a casing, having a lateral wall which is provided with an exposure aperture to form a gate member, and a pressure member for holding a film against said lateral wall and across said aperture, of a cover engaging said lateral wall and enclosing said casing, and edge guiding means including on said cover a pair of bosses each for engaging the edge of the film between the gate and pressure members and at opposite sides of the exposure aperture.

18. In a film magazine, the combination with a casing having a lateral wall which is provided with an exposure aperture to form a gate member, and a pressure member for holding a film against said lateral wall and across said aperture, of a cover engaging said lateral wall and enclosing said casing, and edge guiding means including on said cover a pair of bosses each for engaging the edge of the film between the gate and pressure members and at opposite sides of the exposure aperture, and each boss having a predetermined thickness for centering the film with respect to said exposure aperture.

19. In a film magazine, the combination with a casing having a lateral wall which is provided with an exposure aperture to form a gate member, and a cover engaging said lateral wall and enclosing said casing, of edge guiding means for centering the film with respect to said exposure aperture and including on said cover a pair of bosses each for engaging at opposite sides of said exposure aperture the edge of the film which is adjacent the same, and a pressure member for holding the film across the aperture in said lateral wall and movable with respect to said edge guiding means, said pressure member being provided with recesses for clearance with respect to said bosses.

20. In a film magazine, the combination with a casing having a side wall, a lateral wall extending around the edge of said side wall, and a cover for enclosing said casing, said lateral wall being provided with an exposure aperture which is laterally centered, and film guiding means within said magazine, and laterally positioned to locate the film with one edge spaced farther from said side wall than the other edge of the film is spaced from said cover and to locate a portion of the film within the magazine in a laterally off-center position, of edge guiding means for the film which is adjacent said exposure aperture and including on said cover a guide member for guiding said other edge of the film and which guide member extends from said cover a predetermined distance laterally to center the film at and with respect to said aperture.

OTTO WITTEL.